United States Patent
Chen et al.

(10) Patent No.: US 12,481,952 B2
(45) Date of Patent: Nov. 25, 2025

(54) LOGISTICS MANAGEMENT METHOD, DEVICE, APPARATUS AND READABLE STORAGE MEDIUM BASED ON INTERNET OF THINGS

(71) Applicant: SHANGHAI XIAHANG IOT TECHNOLOGY CO., LTD., Shanghai (CN)

(72) Inventors: Zhengan Chen, Shanghai (CN); Xin Chen, Shanghai (CN)

(73) Assignee: SHANGHAI XIAHANG IOT TECHNOLOGY CO., LTD., Shanghai (CN)

( * ) Notice: Subject to any disclaimer, the term of this patent is extended or adjusted under 35 U.S.C. 154(b) by 242 days.

(21) Appl. No.: 18/352,232

(22) Filed: Jul. 13, 2023

(65) Prior Publication Data

US 2024/0412155 A1    Dec. 12, 2024

Related U.S. Application Data

(63) Continuation of application No. PCT/CN2023/099017, filed on Jun. 8, 2023.

(30) Foreign Application Priority Data

Jun. 7, 2023   (CN) .......................... 202310671462.5

(51) Int. Cl.
*G06Q 10/0834*     (2023.01)
*G06Q 10/0631*     (2023.01)
(Continued)

(52) U.S. Cl.
CPC . *G06Q 10/0834* (2013.01); *G06Q 10/063112* (2013.01); *G06V 10/762* (2022.01);
(Continued)

(58) Field of Classification Search
CPC ....... G06Q 10/0834; G06Q 10/063112; G06Q 10/0838; G06V 10/762; G06V 10/764;
(Continued)

(56) References Cited

U.S. PATENT DOCUMENTS

| 11,107,029 B1* | 8/2021 | Henry ................ G06Q 10/0833 |
| 2015/0348282 A1* | 12/2015 | Gibbon ................ G06V 20/647 |
| | | 382/103 |

(Continued)

FOREIGN PATENT DOCUMENTS

| CN | 111723705 A | * | 9/2020 |
| CN | 113821498 A | * | 12/2021 |
| CN | 116011904 A | * | 4/2023 |

OTHER PUBLICATIONS

S. Mohammed, H. R. Arabnia, X. Qu, D. Zhang, T.-H. Kim and J. Zhao, "IEEE Access Special Section Editorial: Big Data Technology and Applications in Intelligent Transportation," in IEEE Access, vol. 8, pp. 201331-201344, 2020, (Year: 2020).*

(Continued)

*Primary Examiner* — Jerry O'Connor
*Assistant Examiner* — Jeremy L Gunn

(57) ABSTRACT

A logistics management method based on the Internet of Things includes: acquiring a packaging image of currently transported goods, information of a departure point of the currently transported goods, and information of an arrival point of the currently transported goods; classifying the currently transported goods to obtain a category of the currently transported goods; matching corresponding first transport vehicles according to the category of the currently transported goods and determining a driver pool corresponding to each of the first transport vehicles; and calculating a final transportation score corresponding to each driver based on historical transportation trajectories of each driver in the driver pool and a historical transportation score of each (Continued)

driver in each historical transportation process, and selecting a driver of the highest final transportation score to transport the currently transported goods.

3 Claims, 3 Drawing Sheets

(51) Int. Cl.
*G06V 10/762* (2022.01)
*G06V 10/764* (2022.01)
*G06V 10/774* (2022.01)
*G06V 10/82* (2022.01)
*G06V 20/50* (2022.01)
*G06Q 10/083* (2023.01)
*G16Y 10/45* (2020.01)

(52) U.S. Cl.
CPC .......... *G06V 10/764* (2022.01); *G06V 10/774* (2022.01); *G06V 10/82* (2022.01); *G06V 20/50* (2022.01); *G06Q 10/0838* (2013.01); *G16Y 10/45* (2020.01)

(58) Field of Classification Search
CPC ...... G06V 10/774; G06V 10/82; G06V 20/50; G16Y 10/45
See application file for complete search history.

(56) References Cited

U.S. PATENT DOCUMENTS

| | | | |
|---|---|---|---|
| 2018/0017405 A1* | 1/2018 | Chen | H04W 4/02 |
| 2018/0060684 A1* | 3/2018 | Ma | G06V 10/82 |
| 2018/0060809 A1* | 3/2018 | Seaman | H04W 4/023 |
| 2019/0279044 A1* | 9/2019 | Vasisht | G06V 10/17 |
| 2020/0234235 A1* | 7/2020 | Martinez Hernandez Magro | G01C 21/343 |
| 2020/0342387 A1* | 10/2020 | Rajkhowa | B60W 40/09 |
| 2023/0376884 A1* | 11/2023 | Lerner | G06Q 10/083 |

OTHER PUBLICATIONS

Translation of CN-116011904-A (Year: 2023).*
Translation of CN-113821498-A (Year: 2021).*
Translation of CN-111723705-A (Year: 2020).*

* cited by examiner

LOGISTICS MANAGEMENT METHOD, DEVICE, APPARATUS AND READABLE STORAGE MEDIUM BASED ON INTERNET OF THINGS

CROSS-REFERENCE TO RELATED PATENT APPLICATIONS

This application is a national stage entry of International Application No. PCT/CN2023/099017, filed on Jun. 8, 2023, which is based upon and claims priority to Chinese Patent Application No. 202310671462.5, filed on Jun. 7, 2023, which is incorporated by reference herein in its entirety.

TECHNICAL FIELD

The present disclosure relates to the technical field of logistics management, in particular, to a logistics management method, device, apparatus and readable storage medium based on the Internet of Things.

BACKGROUND

The logistics industry has evolved with the change of people's life style. At present, the volume of express and logistics transactions in China is growing rapidly, and the delivery of goods is facing huge challenges as well as new opportunities. Since customers propose higher and higher requirements for the delivery of goods, the ability and level to service customers is of great significance to the development of logistics companies. Among all the factors, in the process of logistics transportation, it is very important that the goods transported are intact and delivered on time. Therefore, there is an urgent need for a method that can improve the transportation quality of goods.

SUMMARY

The objective of the present disclosure is to provide a logistics management method, device, apparatus and readable storage medium based on the Internet of Things, so as to improve the above problems.

In order to achieve the above objective, the present application provides the following technical solutions.

According to one aspect of the present disclosure, an embodiment of the present disclosure provides a logistics management method based on the Internet of Things, including:

acquiring a packaging image of currently transported goods, information of a departure point of the currently transported goods, and information of an arrival point of the currently transported goods;

classifying the currently transported goods according to a pre-trained goods classification model and the packaging image of the currently transported goods to obtain a category of the currently transported goods;

matching corresponding first transport vehicles according to the category of the currently transported goods and determining a driver pool corresponding to each of the first transport vehicles; and calculating a final transportation score corresponding to each driver based on historical transportation trajectories of each driver in the driver pool and a historical transportation score of each driver in each historical transportation process, and selecting a driver of the highest final transportation score to transport the currently transported goods.

According to a second aspect of the present disclosure, an embodiment of the present disclosure provides a logistics management device based on the Internet of Things, and the device includes an acquisition module, a classification module, a matching module and a calculation module.

The acquisition module is configured to obtain the packaging image of the currently transported goods, the information of the departure point of the currently transported goods, and the information of the arrival point of the currently transported goods;

the classification module is configured to classify the currently transported goods according to the pre-trained goods classification model and the packaging image of the currently transported goods to obtain the category of the currently transported goods;

the matching module is configured to match the corresponding first transport vehicles according to the category of the currently transported goods and determine the driver pool corresponding to each of the first transport vehicles;

the calculation module is configured to calculate the final transportation score corresponding to each driver based on the historical transportation trajectories of each driver in the driver pool and the historical transportation score of each driver in each historical transportation process and the driver of the highest final transportation score is selected to transport the currently transported goods.

According to a third aspect of the present disclosure, one embodiment of the present disclosure provides a logistics management apparatus based on Internet of Things, the apparatus includes a memory and a processor. The memory is configured to store computer programs, and the processor is configured to implement the steps of the logistics management method based on the Internet of Things when executing the computer programs.

According to a fourth aspect of the present disclosure, one embodiment of the present disclosure provides a readable storage medium, computer programs are stored in the readable storage medium, and when the computer programs are executed by a processor, the above-mentioned steps of the logistics management method based on the Internet of Things are implemented.

The present disclosure has the following advantages.

1. According to the present disclosure, at the beginning, the currently transported goods are classified by a pre-trained goods classification model, by doing so, the category/categories of the currently transported goods can be quickly identified. Compared with manual classification, the method of the present disclosure is more convenient and efficient. Meanwhile, according to the present disclosure, the transport vehicles are selected correspondingly according to different categories, by doing so, the safety of goods transportation can be improved and it can be ensured that the goods are delivered to the customer without any damages. After the category/categories of the goods is/are identified, a matching vehicle is assigned. Further, sine each driver may be skillful at a certain type of vehicle, after the corresponding transport vehicle is matched, a driver pool matching with the transport vehicle is obtained according to the characteristics of the vehicle so as to obtain the corresponding driver pool, and each driver is given a final score in view of the historical transportation trajectories of each driver and the historical transportation score of each driver in each historical transportation process. The driver of the highest score is selected as the driver to transport the current goods. In this way, the driver who is familiar with the transportation route of the current goods and can provide good services can be selected out, thus the transportation is more time-efficient and the transportation service quality can be improved. In summary, the method of the present disclosure not only can select a vehicle that is suitable for transporting current goods, but also can select a driver with a higher degree of fitness, thereby improving the quality of transportation and customer satisfaction degree.

2. When transporting special goods, especially for different goods such as "dangerous goods", "perishable refrigerated goods", "valuable goods", "vivid plants", "vivid animals", "large and bulky items" etc., different requirements are proposed for the transport vehicles and drivers, and the present disclosure provides targeted improvements to these steps. Specifically, the method of the present disclosure can not only match and select the vehicle that can transport goods safely for the user, but also can match and select the driver that is time-efficient and can provide better services for the user. With the improvements in the above two aspects, when transporting special goods, the quality of transportation can be improved, and the special goods can be delivered to customers safely and on time.

BRIEF DESCRIPTION OF THE DRAWINGS

In order to further clarify the technical solutions of the embodiments of the present disclosure, the accompanying drawings of corresponding embodiments will be briefly introduced below. It should be understood that the following drawings only show some of the embodiments of the present disclosure and should not be regarded as limiting the scope of protection. For those of ordinary skill in the art, other related drawings may be derived based on these drawings without creative effort.

DETAILED DESCRIPTION OF THE EMBODIMENTS

Figure 1:
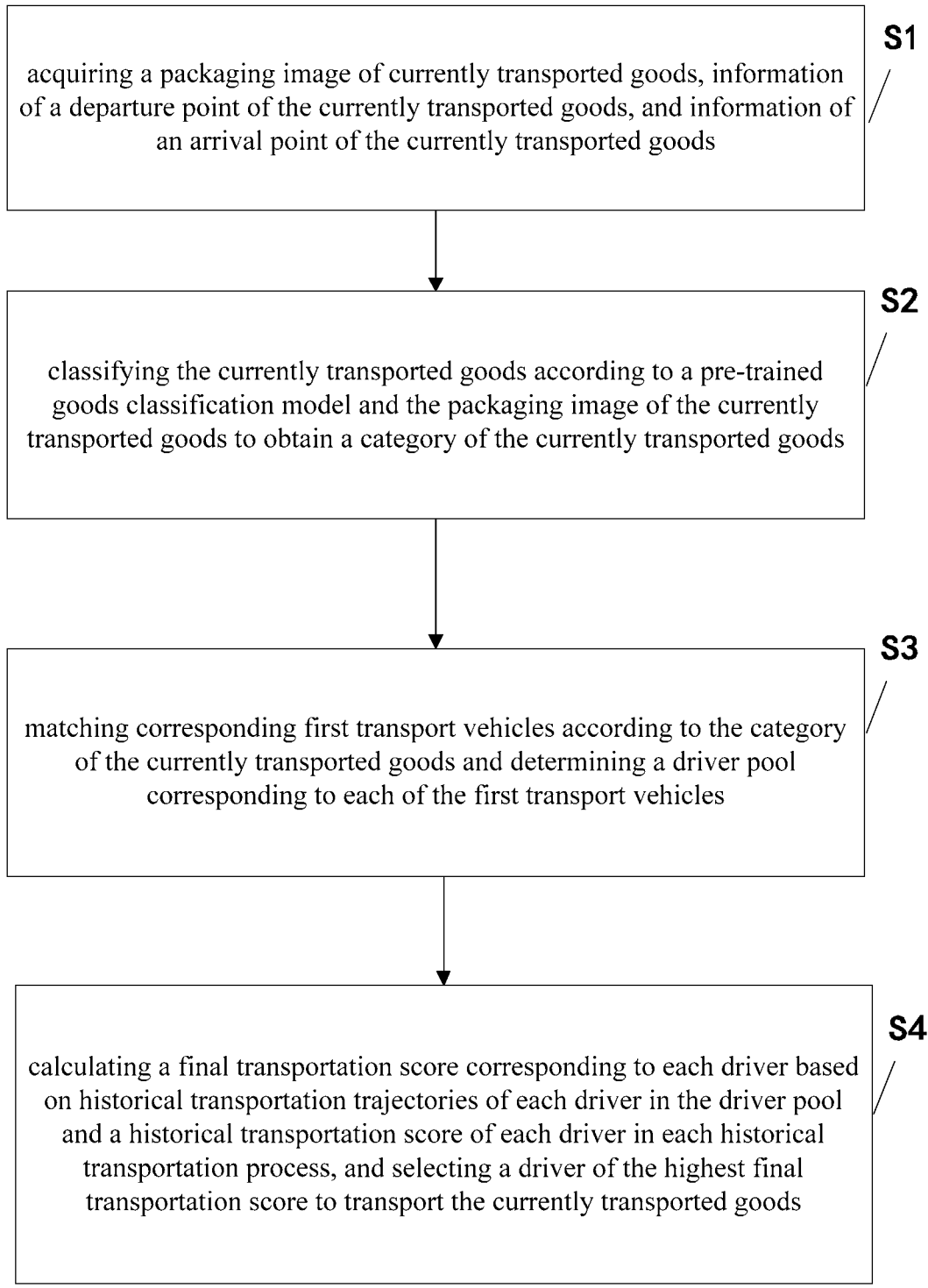
FIG. 1 is a flow chart of a logistics management method based on the Internet of Things according to an embodiment of the present disclosure.

In order to further clarify the objectives, technical solutions and advantages of the embodiments of the present disclosure, the technical solutions of the embodiments of the present disclosure will be clearly and completely described below in conjunction with the drawings of the corresponding embodiments of the present disclosure. Obviously, the described embodiments are part of the embodiments of the present disclosure rather than all of them. Generally, the components of the embodiments of the present disclosure described and illustrated in the drawings herein may be arranged and designed in a variety of different configurations. Accordingly, the following detailed description of the embodiments of the present disclosure provided in the accompanying drawings is not intended to limit the scope of protection of the claimed invention, but merely represents selected embodiments of the invention. Based on the embodiments of the present disclosure, all other embodiments obtained by those of ordinary skill in the art without creative efforts fall within the protection scope of the present disclosure.

Embodiment 1

As shown in FIG. 1, the present embodiment provides a logistics management method based on the Internet of Things, and the method includes step S1, step S2, step S3 and step S4.

Step S1: acquiring a packaging image of currently transported goods, information of a departure point of the currently transported goods, and information of an arrival point of the currently transported goods.

In this step, considering that the packaging of the transported goods can reflect the transportation method required by the goods, for example, if the packaging shows words "refrigerated", then cold chain transportation is required, so the packaging image of the transported goods is collected. In this step, the form of the packaging image may be an image made up of the images of the side faces of the packaging box.

Step S2: classifying the currently transported goods according to a pre-trained goods classification model and the packaging image of the currently transported goods to obtain a category of the currently transported goods.

In this step, the goods classification model can be obtained by a software named Halcon. Specifically, the pretrained network in Halcon, i.e. pretrained_dl_classifier_compact.hdl, is called.

In one of the embodiments, 323 images are collected, including 110 images labeled as "ordinary sundries" and 213 images labeled as "special goods". Further, among the 213 images labeled as "special goods", 58 images are labeled as "dangerous goods", 26 images are labeled as "perishable refrigerated goods", 38 images are labeled as "valuable goods", 10 images are labeled as "vivid plants", 31 images are labeled as "vivid animals", and 50 images are labeled as "large and bulky items". The method to classify the abovementioned "special goods" is prior art, and will not be discussed in detail herein. The images labeled as "ordinary sundries" and "special goods" are respectively stored in folders named "normal", "innormal-dangerous", "innormal-perishable refrigerated", "innormal-valuables", "innormal-vivid plants", "innormal-vivid animals" and "innormal-Large and bulky items" according to the labeling categories. Afterwards, read_dl_classifier_data_set is used to directly read the corresponding data set to obtain the files and the category labels of the images. Then, the pre-trained network in Halcon is called for training to finally output the goods-based classification model. Since special goods such as "dangerous goods", "perishable refrigerated goods", "valuable goods", "vivid plants", "vivid animals", "large and bulky goods", and so on propose different requirements for transport vehicles and drivers, the present disclosure provides a method to classify the goods and improve the transportation quality with creativeness. The method can not only select vehicles that can ensure the safe transportation of goods for the user, but also can match and select drivers who are more time-efficient and can provide better services.

Using the pre-trained goods classification model to classify the currently transported goods can quickly identify the category/categories of the currently transported goods. Compared with manual classification, the method in this step is more convenient and quicker. The specific implementation of this step includes step S21 and step S22.

Step S21: acquiring the packaging image/images of the historically transported goods, and labeling the packaging image/images of the historically transported goods, wherein the labeling information includes the category/categories of the historically transported goods; marking the labeled packaging image/images of the historically transported goods as first data, inputting each of the first data into a deep residual network for prediction processing, obtaining a first processing result, and calculating a cross-entropy loss corresponding to the first data according to the first processing result.

In this step, considering that there may be noisy data in the first data, the purpose of this step is to filter the first data to reduce the impact of the noisy data on model training. Specifically, the deep residual network can also be replaced by a convolutional neural network, and the cross-entropy loss obtained from calculation can be used to measure the uncertainty of the first data.

Step S22: completing filtration of the first data based on the cross-entropy loss and the first data, using filtered first data to train the deep residual network, obtaining the goods classification model, and inputting the packaging image of the currently transported goods into the goods classification model to obtain the category of the currently transported goods. Through the above steps, the special goods, such as "dangerous goods", "perishable refrigerated goods", "valuable goods", "vivid plants", "vivid animals", "large and bulky items" and so on can be classified more accurately.

The specific implementation of this step include step S221 and step S222.

Step S221: inputting the first data into a stacked autoencoder to obtain second data, and performing supervised training on the stacked autoencoder according to an absolute value of a first differential value between the first data and the second data to obtain a trained stacked autoencoder.

In this step, the stacked autoencoder may also be replaced with a denoising autoencoder or a sparse autoencoder.

Step S222: inputting each of the first data into the trained stacked autoencoder, marking an absolute value of a differential value between an output of the trained stacked autoencoder and the first data as third data, completing training of the deep residual network according to the cross-entropy loss and the third data corresponding to each first data, and obtaining the goods classification model.

In this step, after the uncertainty of the first data is calculated, reconstruction error is further calculated, and the third data obtained from the calculation is the reconstruction error corresponding to the first data. The training performed after the cross-entropy loss and the third data are calculated specifically includes step S2221 and step S2222.

Step S2221: performing weighted sum calculation on the cross-entropy loss and the third data corresponding to each first data according to the respective weight of the cross-entropy loss and the third data to obtain fourth data corresponding to each first data, wherein the respective weight of the cross-entropy loss and the third data are different.

In this step, the respective weight of the cross-entropy loss and the third data may be customized according to the user's demands. The filtration of the first data performed according to the cross-entropy loss and the third data obtained from calculation may also be understood as a noise reduction filtration of the first data from the dimension of uncertainty and the dimension of representativeness.

Step S2222: sorting the first data according to the value of the corresponding fourth data to obtain sorted first data, wherein the smaller the value of the fourth data is, the corresponding first data is arranged earlier in the data set. In the sorted first data, a part of the data is selected according to preset selection rules to train the deep residual network to obtain the goods classification model.

This step can be understood as follows, for example, if the fourth data corresponding to the first piece of first data is the smallest, then the first piece of first data is arranged at the most forward position. Meanwhile, the preset selection rules in this step may be set as selecting the data from front to back according to a preset ratio. For example, 60% of data is selected from the sorted first data from front to back, and the specific ratio may be customized according to user's demands. After the first data is filtered, the filtered data is used for model training, such that the accuracy of training samples can be improved, and the accuracy of model training and the accuracy of the subsequent recognition can be improved.

Step S3: finding a corresponding first transport vehicle matched with the category of the currently transported goods, and determining a driver pool corresponding to each first transport vehicle.

In this step, after the category of the currently transported goods is determined, the vehicle for transporting this type of goods can be matched. For example, when the category of the currently transported goods is identified as refrigerated goods, a cold chain transport vehicle is matched/selected, and after the transport vehicle is matched/selected, the corresponding driver is matched/selected. When the category of the currently transported goods is identified as dangerous goods, a vehicle for transporting dangerous goods is matched/selected, and after the transport vehicle is matched/selected, the corresponding driver is matched/selected, etc. The specific method for implementing the matching may include step S31 and step S32.

Step S31: acquiring historical transport vehicle images, identifying characteristics of the historical transport vehicle images by a neural network model, clustering historical transport vehicles according to a K-means clustering method and the characteristics of the historical transport vehicle images to obtain clustering results, and constructing a corresponding driver pool for each class of the clustering results.

In this step, for example, the characteristic may be oil-powered vehicle or electric vehicle, or other characteristics, which are not limited in this step. The driver pool corresponding to each clustering result is a driver pool manually uploaded according to the clustering results.

In this step, considering that each driver may be skillful at a certain type of vehicle, after matching the transport vehicle, the driver pool that matches with the vehicle is obtained according to the characteristics of the vehicle.

Step S32: determining whether the clustering result corresponding to the first transport vehicles has been generated according to the images of the first transport vehicles, if yes, matching the corresponding driver pool for the first transport vehicles, if not, calculating a similarity between the characteristics of the first transport vehicles and the characteristics of the historical transport vehicles, determining the clustering result corresponding to the first transport vehicles according to the similarity calculation result, and then matching the corresponding driver pool.

Step S4: calculating a final transportation score of each driver based on historical transportation trajectories of each driver in the driver pool and a historical transportation score of each driver in each historical transportation process, and selecting a driver of the highest final transportation score to transport the currently transported goods.

In this step, after the corresponding driver pool is matched, the drivers are also scored from the dimension of each driver's historical transportation trajectories and the dimension of each driver's historical transportation score in each historical transportation process, and the driver of the highest score will be selected as the driver to transport the currently transported goods. The specific implementation of this step may include step S41 and step S42.

Step S41: acquiring the historical transportation trajectories of each driver in the driver pool and acquiring the historical transportation score of each driver in each historical transportation process.

Step S42: calculating a first transportation trajectory according to information of departure point of the transported goods and information of arrival point of the transported goods, and calculating a first transportation score of each driver based on a similarity between the historical transportation trajectory of each driver and the first transportation trajectory, performing comprehensive calculation according to the historical transportation score of each driver in each historical transportation process to obtain a second transportation score of each driver, calculating the final transportation score of each driver according to the first transportation score, the second transportation score, and their respective weight.

In this step, the respective weight of the first transportation score and the second transportation score may be customized according to user's demands, and the specific implementation of this step may include step S421 and step S422.

Step S421: calculating the similarity between the historical transportation trajectory of each driver and the first transportation trajectory, and calculating the mean value of all the similarity calculation results to obtain the first transportation score corresponding to each driver; putting the historical transportation scores of each driver together to obtain a first historical transportation score set, and randomly selecting two historical transportation scores from the first historical transportation score set and putting the two scores together to create a historical transportation score group, and a plurality of historical transportation score groups are obtained.

Step S422: performing clustering processing on all the historical transportation score groups by using a hierarchical clustering algorithm to obtain multiple clustering categories, and analyzing the clustering categories by using an inflection point analysis to obtain a threshold range of each clustering category, wherein the minimum value in the threshold range is a first value, and the maximum value in the threshold range is a second value; selecting the smallest value from all the first values and marking it as a third value; selecting the smallest value from all the second values and marking it as a fourth value; removing the historical transportation score with a value that is less than the third value or greater than the fourth value from the first historical transportation score set corresponding to each driver to obtain a second historical transportation score set, and calculating the mean value of the data in the second historical transportation score set to obtain the second transportation score of each driver.

In this step, the k-meams clustering algorithm or a density-based clustering algorithm may also be used to perform the clustering processing on all the historical transportation score groups. In this step, all historical transportation scores of each driver are subjected to abnormal data processing, by doing so, the accuracy of the second transportation score can be improved.

Embodiment 2

Figure 2:
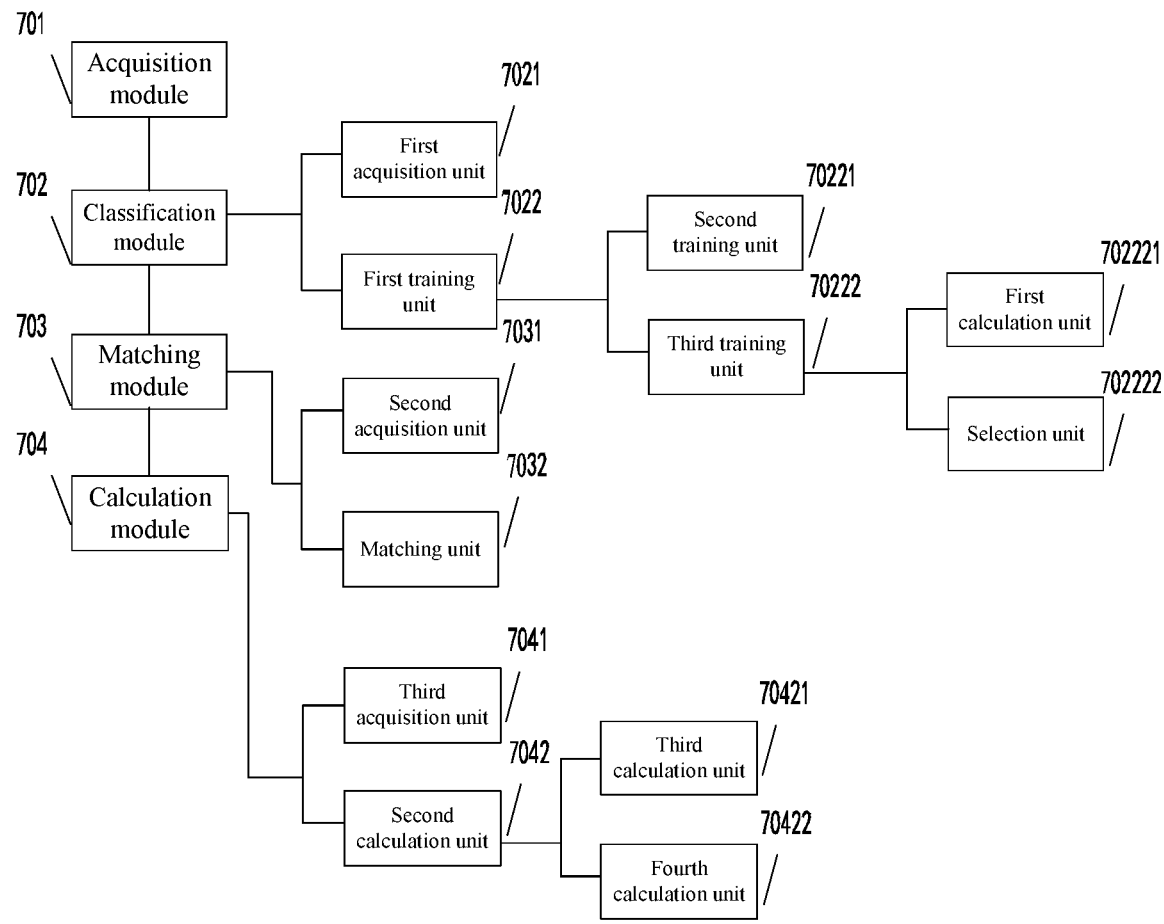
FIG. 2 is a schematic structural diagram of a logistics management device based on the Internet of Things according to an embodiment of the present disclosure.

As shown in FIG. 2, this embodiment provides a logistics management device based on the Internet of Things, and the device includes an acquisition module 701, a classification module 702, a matching module 703 and a calculation module 704.

The acquisition module 701 is configured to acquire the packaging image of the currently transported goods, information of a departure point of the currently transported goods, and information of an arrival point of the currently transported goods.

The classification module 702 is configured to classify the currently transported goods according to a pre-trained goods classification model and the packaging image of the currently transported goods to obtain category/categories of the currently transported goods.

The matching module 703 is configured to match corresponding first transport vehicles according to the category of the currently transported goods and determine a driver pool corresponding to each first transport vehicle.

The calculation module 704 is configured to calculate a final transportation score corresponding to each driver based on the historical transportation trajectories of each driver in the driver pool and the historical transportation score of each driver in each historical transportation process, and to select a driver of the highest final transportation score to transport the currently transported goods.

In a specific implementation of the present disclosure, the classification module 702 further includes a first acquisition unit 7021 and a first training unit 7022.

The first acquisition unit 7021 is configured to acquire the packaging images of the historically transported goods, and to label the packaging images of the historically transported goods. Specifically, the labeling information includes the category of the historically transported goods. The first acquisition unit 7021 is also configured to mark the labeled packaging image of the historically transported goods as first data, input each first data into a deep residual network for prediction processing to obtain a first processing result, and calculate a cross-entropy loss corresponding to the first data according to the first processing result.

The first training unit 7022 is configured to complete the filtration of the first data based on the cross-entropy loss and the first data, train the deep residual network by using the filtered first data to obtain the goods classification model, and input the packaging images of the currently transported goods into the goods classification model to obtain the category/categories of the currently transported goods.

In a specific implementation of the present disclosure, the first training unit 7022 further includes a second training unit 70221 and a third training unit 70222.

The second training unit 70221 is configured to input the first data into a stacked autoencoder to obtain second data, and perform supervised training on the stacked autoencoder according to the absolute value of a first differential value between the first data and the second data to obtain a trained stacked autoencoder.

The third training unit 70222 is configured to input each first data into the trained stacked autoencoder, mark the absolute value of a differential value between the output of the trained stacked autoencoder and the first data as third data; and complete the training of the deep residual network according to the cross-entropy loss and the third data corresponding to each first data to obtain the goods classification model.

In a specific implementation of the present disclosure, the third training unit 70222 further includes a first calculation unit 702221 and a selection unit 702222.

The first calculation unit 702221 is configured to perform weighted sum calculation on the cross-entropy loss and the third data corresponding to each first data according to the respective weight of the cross-entropy loss and the third data to obtain fourth data corresponding to each first data, wherein the respective weight of the cross-entropy loss and the third data are different.

The selection unit 702222 is configured to sort the first data according to the value of the corresponding fourth data to obtain the sorted first data, wherein the smaller the value of the fourth data, the corresponding first data is arranged earlier; a part of data is selected from the sorted first data according to a preset selection rule to train the deep residual network and obtain the goods classification model.

In a specific implementation of the present disclosure, the matching module 703 further includes a second acquisition unit 7031 and a matching unit 7032.

The second acquisition unit 7031 is configured to acquire historical transport vehicle images, identify characteristics of the historical transport vehicle images by using a neural network model, perform clustering on the historical transport vehicles according to a K-means clustering method and the characteristics of the historical transport vehicle images to obtain clustering results, and construct a driver pool for each category of the clustering results.

The matching unit 7032 is configured to determine whether a clustering result corresponding to the first transport vehicle has been generated based on the images of the first transport vehicle, if yes, match the corresponding driver pool for the first transport vehicle; if no, calculate the similarity between the characteristics of the first transport vehicle and the characteristics of the historical transport vehicle, determine the clustering result corresponding to the first transport vehicle according to the similarity calculation result, and then match the corresponding driver pool.

In a specific implementation of the present disclosure, the calculation module 704 further includes a third acquisition unit 7041 and a second calculation unit 7042.

The third acquisition unit 7041 is configured to obtain the historical transportation trajectories of each driver in the driver pool and obtain the historical transportation score of each driver in each historical transportation process.

The second calculation unit 7042 is configured to calculate the first transportation trajectory according to the information of the departure point of the transported goods and the information of the arrival point of the transported goods, calculate the first transportation score of each driver based on the similarity between the historical transportation trajectory of each driver and the first transportation trajectory; perform comprehensive calculation according to the historical transportation score of each driver in each historical transportation process to obtain a second transportation score of each driver, and calculate the final transportation score of each driver according to the first transportation score, the second transportation score, and their respective weight.

In a specific implementation of the present disclosure, the second calculation unit 7042 further includes a third calculation unit 70421 and a fourth calculation unit 70422.

The third calculation unit 70421 is configured to calculate the similarity between the historical transportation trajectory of each driver and the first transportation trajectory, calculate the mean value of all the similarity calculation results to obtain the corresponding first transportation scores of each driver, put the historical transportation scores corresponding to each driver together to obtain a first historical transportation score set, and randomly select two historical transportation scores from the first historical transportation score set to create a historical transportation score group, wherein multiple historical transportation score groups are obtained.

The fourth calculation unit 70422 is configured to perform clustering processing on all the historical transportation score groups by using a hierarchical clustering algorithm to obtain multiple clustering categories, and analyze the clustering categories by using an inflection point analysis to obtain a threshold range of each clustering category, wherein the minimum value in the threshold range is a first value, and the maximum value in the threshold range is a second value; the smallest value is selected from all the first values and marked as a third value; the smallest value from all the second values is selected and marked as a fourth value; the historical transportation score with a value that is less than the third value or greater than the fourth value is removed from the first historical transportation score set corresponding to each driver to obtain a second historical transportation score set, and the mean value of the data in the second historical transportation score set is calculated to obtain the second transportation score of each driver.

It should be noted that regarding the device described in the above embodiments the specific method for executing and performing each module has been described in detail in the related method embodiments, so the details are not repeated herein.

Embodiment 3

Corresponding to the method embodiment described above, the present embodiment of the present disclosure also provides a logistics management apparatus based on the Internet of Things, and the logistics management apparatus based on the Internet of Things described below can correspondingly and mutually refer to the logistics management method based on the Internet of Things (IoT for short) described above.

Figure 3:
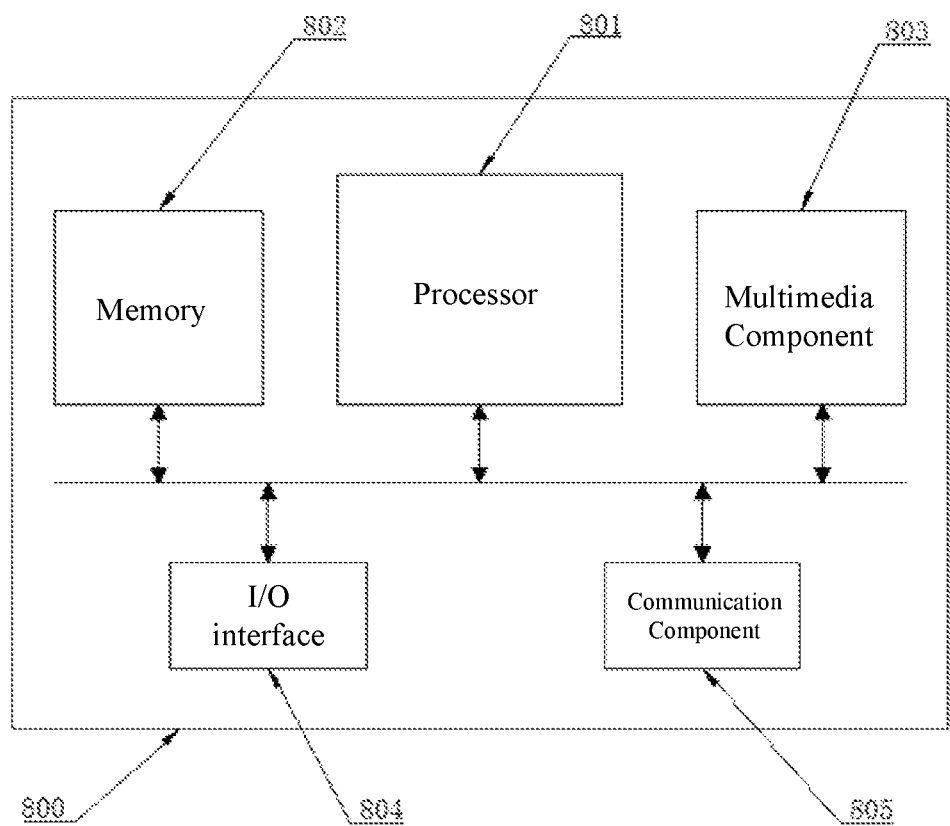
FIG. 3 is a schematic structural diagram of a logistics management apparatus based on the Internet of Things according to an embodiment of the present disclosure.

FIG. 3 is a block diagram of an IoT-based logistics management apparatus 800 according to an exemplary embodiment. As shown in FIG. 3, the IoT-based logistics management device 800 may include a processor 801 and a memory 802. The IoT-based logistics management device 800 may also include one or more items selected from multimedia component 803, I/O interface 804, and communication component 805.

Specifically, the processor 801 is configured to control the overall operation of the IoT-based logistics management apparatus 800, so as to execute all or part of the steps of the above-mentioned logistics management method based on the Internet of Things. The memory 802 is configured to store various types of data to support the operation of the IoT-based logistics management device 800, and the data may include, for example, the instructions of any application program or method for operating on the IoT-based logistics management apparatus 800, as well as the application-related data, such as contact data, sent and received messages, pictures, audio, video, etc. The received audio signal may be further stored in the memory 802 or sent through the communication component 805. The audio component further includes at least one speaker for outputting audio signals. The I/O interface 804 provides interface/interfaces for connecting the processor 801 and other interface modules. The interface modules may be a keyboard, a mouse, buttons, and so on. These buttons may be virtual buttons or physical buttons. The communication component 805 is used for wired or wireless communication between the IoT-based logistics management apparatus 800 and other devices. Wireless communication, such as Wi-Fi, Bluetooth, Near Field Communication (NFC for short), 2G, 3G, 4G, or a combination of one or more of them, so the corresponding communication component 805 may include a Wi-Fi module, a Bluetooth module, an NFC module.

In another exemplary embodiment, a computer-readable storage medium containing program instructions is also provided, and when the program instructions are executed by a processor, the steps of the above-mentioned logistics management method based on the Internet of Things are implemented. For example, the computer-readable storage medium may be the above-mentioned memory 802 containing program instructions, and the above-mentioned program instructions may be executed by the processor 801 of the IoT-based logistics management apparatus 800 to complete the above-mentioned logistics management method based on the Internet of Things.

Embodiment 4

Corresponding to the method embodiment described above, the present embodiment of the present disclosure also provides a readable storage medium, and the readable storage medium described below can correspondingly and mutually refer to the logistics management method based on the Internet of Things (IoT for short) described above.

A readable storage medium is stored with computer programs, when the computer programs are executed by a processor, the steps of the logistics management method based on the Internet of Things of the foregoing method embodiments are implemented.

Specifically, the readable storage medium may be a USB flash drive, a mobile hard disk, a read-only memory (ROM), a random access memory (RAM), a magnetic disk, an optical disk, or other readable storage medium that can store program codes.

The above description merely involves preferred embodiments of the present disclosure, and is not intended to limit the present disclosure. For those skilled in the art, the present disclosure may have various modifications and changes. Any modifications, equivalent substitution, improvements and so on made within the spirit and principles of the present disclosure shall be included within the protection scope of the present disclosure.

What is claimed is:

1. A logistics management method based on the Internet of Things, comprising:
   acquiring a packaging image of currently transported goods, information of a departure point of the currently transported goods, and information of an arrival point of the currently transported goods;
   classifying the currently transported goods according to a pre-trained goods classification model and the packaging image of the currently transported goods to obtain a category of the currently transported goods;
   matching corresponding first transport vehicles according to the category of the currently transported goods and determining a driver pool corresponding to each of the first transport vehicles; and
   calculating a final transportation score corresponding to each driver based on historical transportation trajectories of each driver in the driver pool and a historical transportation score of each driver in each historical transportation process, and selecting a driver of a highest final transportation score to transport the currently transported goods;
   wherein the step of classifying the currently transported goods according to the pre-trained goods classification model and the packaging image of the currently transported goods to obtain the category of the currently transported goods comprises:
   acquiring the packaging image of historically transported goods, and labeling the packaging image of the historically transported goods, wherein labeling information comprises a category of the historically transported goods, marking labeled packaging image of the historically transported goods as first data, inputting each of the first data into a deep residual network for prediction processing, obtaining a first processing result, and calculating a cross-entropy loss corresponding to the first data according to the first processing result;
   inputting the first data into a stacked autoencoder to obtain second data, and performing supervised training on the stacked autoencoder according to an absolute value of a first differential value between the first data and the second data to obtain a trained stacked autoencoder;
   inputting each of the first data into the trained stacked autoencoder, marking an absolute value of a differential value between an output of the trained stacked autoencoder and the first data as third data;
   performing weighted sum calculation on the cross-entropy loss and the third data corresponding to each first data according to a respective weight of the cross-entropy loss and the third data to obtain fourth data corresponding to each first data, wherein the respective weight of the cross-entropy loss and the third data are different;
   sorting the first data according to a value of the corresponding fourth data to obtain a sorted first data set, wherein the smaller the value of the fourth data is, the corresponding first data is arranged earlier in the sorted first data set, a part of the data is selected from front to back of the sorted first data set according to a preset ratio to train the deep residual network to obtain the pre-trained goods classification model;
   wherein the step of matching the corresponding first transport vehicles according to the category of the currently transported goods and determining the driver pool corresponding to each of the first transport vehicles comprises:
   acquiring historical transport vehicle images, identifying characteristics of the historical transport vehicle images by a neural network model, clustering historical transport vehicles according to a K-means clustering method and the characteristics of the historical transport vehicle images to obtain clustering results, and constructing a corresponding driver pool for each class of the clustering results;
   determining whether the clustering result corresponding to the first transport vehicles has been generated according to the images of the first transport vehicle, if yes, matching the corresponding driver pool for the first transport vehicle, if not, calculating a similarity between the characteristics of the first transport vehicle and the characteristics of the historical transport vehicle, determining the clustering result corresponding to the first transport vehicles according to the similarity calculation result, and then matching the corresponding driver pool.

2. The logistics management method based on the Internet of Things according to claim 1, wherein the step of calculating a final transportation score of each driver based on historical transportation trajectories of each driver in the driver pool and a historical transportation score of each driver in each historical transportation process comprises:

acquiring the historical transportation trajectories of each driver in the driver pool and acquiring the historical transportation score of each driver in each historical transportation process;

calculating a first transportation trajectory according to information of departure point of the transported goods and information of arrival point of the transported goods, and calculating a first transportation score of each driver based on a similarity between the historical transportation trajectory of each driver and the first transportation trajectory, performing comprehensive calculation according to the historical transportation score of each driver in each historical transportation process to obtain a second transportation score of each driver, calculating the final transportation score of each driver according to the first transportation score, the second transportation score, and their respective weight.

3. A logistics management apparatus based on the Internet of Things, comprising:

a memory, configured to store computer programs;

a processor, wherein when the computer programs are executed by the processor, the steps of the logistics management method based on the Internet of Things according to claim 1 are implemented.

\* \* \* \* \*